US012590554B2

(12) United States Patent
    Weiss

(10) Patent No.: US 12,590,554 B2
(45) Date of Patent: Mar. 31, 2026

(54) CATALYTIC CONVERTER FOR A MOTOR VEHICLE, AS WELL AS A MOTOR VEHICLE

(71) Applicant: Mercedes-Benz Group AG, Stuttgart (DE)

(72) Inventor: Stefan Weiss, Holzgerlingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 164 days.

(21) Appl. No.: 18/043,473

(22) PCT Filed: Aug. 30, 2021

(86) PCT No.: PCT/EP2021/073828
    § 371 (c)(1),
    (2) Date: Feb. 28, 2023

(87) PCT Pub. No.: WO2022/049014
    PCT Pub. Date: Mar. 10, 2022

(65) Prior Publication Data
    US 2023/0243286 A1 Aug. 3, 2023

(30) Foreign Application Priority Data
    Sep. 1, 2020 (DE) ..................... 10 2020 005 360.2

(51) Int. Cl.
    *F01N 3/28* (2006.01)
    *B01D 53/94* (2006.01)

(52) U.S. Cl.
    CPC ........... *F01N 3/2839* (2013.01); *B01D 53/94* (2013.01); *B01D 2259/4566* (2013.01)

(58) Field of Classification Search
    CPC ................. F01N 3/2839; B01D 53/94; B01D 2259/4566
    (Continued)

(56) References Cited

U.S. PATENT DOCUMENTS

| 6,555,070 B1 | 4/2003 | Krueger |
| 2004/0050618 A1 | 3/2004 | Marocco |
| | (Continued) | |

FOREIGN PATENT DOCUMENTS

| CA | 2763018 A1 * | 8/2011 | .......... F01N 3/2066 |
| CN | 1806099 A | 7/2006 | |
| | (Continued) | | |

OTHER PUBLICATIONS

PCT/EP2021/073828, International Search Report dated Nov. 18, 2021 (Two (2) pages).

(Continued)

*Primary Examiner* — Mark A Laurenzi
*Assistant Examiner* — Kelsey L Stanek
(74) *Attorney, Agent, or Firm* — Crowell & Moring LLP

(57) ABSTRACT

A catalytic converter includes a housing and a catalyst carrier disposed in a receiving chamber of the housing. The housing has an inlet opening and at least two outlet openings. The inlet opening is formed in an inlet wall which completely seals the receiving chamber, except for the inlet opening, in a direction running parallel to a main direction of flow and pointing away from the at least two outlet openings and the inlet wall extends in a plane running perpendicular to the main direction of flow. The at least two outlet openings are formed in an outlet wall which completely seals the receiving chamber, except for the at least two outlet openings, in a direction running parallel to the main direction of flow and pointing away from the inlet opening and the outlet wall extends in a plane running perpendicular to the main direction of flow.

4 Claims, 3 Drawing Sheets

(58) Field of Classification Search
USPC ........................................................ 422/180
See application file for complete search history.

(56) References Cited

U.S. PATENT DOCUMENTS

| | | |
|---|---|---|
| 2006/0213189 A1 | 9/2006 | Allansson et al. |
| 2014/0166393 A1 | 6/2014 | Butler et al. |
| 2019/0107025 A1 | 4/2019 | Brinkmeyer |

FOREIGN PATENT DOCUMENTS

| | | | | |
|---|---|---|---|---|
| DE | 195 24 980 A1 | 1/1997 | | |
| DE | 10 2012 023 049 A1 | 5/2014 | | |
| DE | 10 2017 205 696 A1 | 10/2018 | | |
| EP | 2 314 834 A1 | 4/2011 | | |
| FR | 2 622 632 A1 | 5/1989 | | |
| FR | 2622632 A | * 5/1989 | .............. | F01N 1/12 |
| JP | 6-146863 A | 5/1994 | | |
| JP | 2008-261229 A | 10/2008 | | |

OTHER PUBLICATIONS

German Search Report issued in German application No. 10 2020 005 360.2 dated Apr. 13, 2021, with Statement of Relevancy (Eight (8) pages).
Chinese-language Office Action issued in Chinese Application No. 202180051527.5 dated Dec. 25, 2025 (8 pages).

* cited by examiner

CATALYTIC CONVERTER FOR A MOTOR VEHICLE, AS WELL AS A MOTOR VEHICLE

BACKGROUND AND SUMMARY OF THE INVENTION

The invention relates to a catalytic converter for a motor vehicle. The invention furthermore relates to a motor vehicle.

DE 10 2012 023 049 A1 discloses an exhaust gas after-treatment device for the after-treatment of an exhaust gas of an internal combustion engine. Furthermore, an exhaust gas system of a multi-cylinder internal combustion engine is known from DE 195 24 980 A1.

It is the object of the present invention to provide a catalytic converter for the after-treatment of exhaust gas as well as a motor vehicle with such a catalytic converter, so that the exhaust gas can be especially advantageously after-treated by means of the catalytic converter.

A first aspect of the invention relates to a catalytic converter for the after-treatment of exhaust gas of an internal combustion engine for a motor vehicle, in particular for a motor car, such as for example a passenger motor car. This in particular means that the motor vehicle comprises the catalytic converter and the internal combustion engine, that is also referred to as the engine or combustion engine and is formed, for example, as a reciprocating piston engine, in its fully manufactured state. In its fired operation, the internal combustion engine provides the mentioned exhaust gas, which can flow through the catalytic converter. The catalytic converter can be formed as a three-way catalytic converter or also as another catalytic converter, such as for example as an SCR-catalytic converter. Further, the catalytic converter can be a particulate filter or comprise such a particulate filter. The particulate filter can in particular be a diesel particulate filter (DPF) or a petrol particulate filter (OPF), so that the internal combustion engine can, for example, be formed as a diesel engine or also as a petrol engine. It is conceivable that the catalytic converter is formed as a so-called under-carriage-catalytic converter, which is arranged in the region of an undercarriage or underneath an undercarriage of the motor vehicle in the vertical direction of the vehicle. Here, the motor vehicle has a structure that is, for example, formed as a self-supporting body, which has the undercarriage mentioned. A passenger compartment of the motor vehicle, also referred to as the interior, is, for example, at least partially, in particular at least mostly or completely delimited downwards in the vertical direction of the vehicle by means of the undercarriage. The structure thereby also, for example, at least partially delimits an engine bay in which the internal combustion engine is arranged. The undercarriage catalytic converter is thereby arranged outside of the engine bay and thereby underneath the undercarriage. It is further possible that the catalytic converter is formed as a catalytic converter near to the engine and is arranged together with the internal combustion engine in the engine bay.

The catalytic converter has a housing that can be flowed through by the exhaust gas and that has or directly delimits a receiving chamber. The catalytic converter also comprises at least or exactly one catalyst carrier that is arranged in the receiving chamber and thus in the housing, which is also simply referred to as a carrier or as a monolith, and is provided with at least one catalytic coating. The catalytic coating is thus supported by the carrier. The catalyst carrier is, for example, also referred to as a substrate or catalyst substrate. The catalyst carrier is preferably a flow-through substrate, i.e., is formed as a flow-through substrate. The flow-through substrate comprises, for example, several tubes arranged next to each other, which are completely open from one end to the opposite other end, and can thus be flowed through by the exhaust gas from one end to the other end, i.e., from the front to the back. The tubes thus, for example, respectively delimit uninterrupted, continuous and open flow ducts from one end to their other end, which, for example, run or are arranged parallel to each other. One of the ends is an in-flow end, at which or through which the exhaust gas can flow into the respective flow duct. Accordingly, the respective other end is an outflow end, at which or through which the exhaust gas can flow out of the respective flow duct.

In the case of a or of the particulate filter, the monolith is, for example, a filter substrate or is formed as a filter substrate. The filter substrate is also referred to as a particulate filter substrate. As opposed to the flow-through substrate, the particulate filter substrate is, for example, a carrier, the flow ducts of which are closed, in particular at the in-flow end or outflow end, so that a maze is formed, in particular by the tubes or by the flow ducts, through which the exhaust gas flows or has to flow on its way through the housing.

In order to be able to especially advantageously after-treat the exhaust gas by means of the catalytic converter, in particular by means of the catalytic coating, it is provided according to the invention that the housing has in particular exactly one inlet opening, also referred to as an in-flow opening, by means of which the exhaust gas can be introduced into the receiving chamber. Therefore, preferably only one single inlet opening is provided, by means of which the exhaust gas can flow into the receiving chamber or flows into the receiving chamber during an operation of the internal combustion engine. The housing also has at least or exactly two outlet openings that are separated from each other and thereby spaced apart from each other, which are also referred to as outflow openings, by means of which the exhaust gas can be discharged from the receiving chamber. In other words, the exhaust gas flows through the outlet opening and preferably only through the outlet openings, out of the receiving chamber and thereby, for example, out of the housing during the operation of the internal combustion engine. Furthermore, it is provided according to the invention that the outlet openings are each arranged at least partially offset from the inlet opening. In other words, the respective outlet opening has at least one section which is arranged without overlap or covering by the inlet opening, i.e., it is not overlapped or covered by the inlet opening. By this the following can in particular be understood: the respective outlet opening extends, for example, in one plane, wherein it can be provided that the outlet openings extend in a plane common to the outlet openings. The respective outlet opening thereby has a respective direction of penetration, which runs perpendicular to the plane, wherein the exhaust gas can flow through the outlet openings along the direction of penetration and can thus flow out of the receiving chamber. The inlet opening, for example, extends in a second plane, which preferably runs parallel to the previously-mentioned first plane. The respective outlet opening and thus the first plane is thereby spaced apart from the inlet opening and thus from the second plane. If, for example, the respective outlet opening is projected into the second plane in a direction running perpendicular to the first plane and/or perpendicular to the second plane, then at least the respective previously-mentioned section of the respective outlet opening is arranged next to the inlet opening, therefore it is not overlapped by the inlet opening or is arranged free of overlap from the inlet opening. It is thereby in particular conceivable that the respective outlet opening has at least one respective second section, which, for example, overlaps, i.e., is arranged in overlap with the inlet opening or in overlap with a respective part of the inlet opening by means of the inlet opening or by means of a respective part of the inlet opening relative to the previously mentioned projection.

The invention is based in particular on the following knowledge: Studies have shown that only an insufficient equal distribution of the exhaust gas or its flow occurs in receiving chambers of conventional catalytic converters, in particular if the receiving chamber, i.e., for example an inner peripheral lateral surface of the housing that delimits the receiving chamber, in particular directly, is oval or circular. This only insufficient equal distribution results from the fact that the exhaust gas is usually introduced into the housing, and in particular centrally into the receiving chamber through an inlet opening, by means of a round exhaust pipe or by means of a round exhaust duct of an exhaust pipe, while—as previously described—the receiving chamber per se is round or oval, i.e., elliptical. Furthermore, an outlet opening is arranged in overlap with the inlet opening. This leads to the exhaust gas or its flow being concentrated in the center of the receiving chamber, so that compared to the center, outer regions of the catalytic coating do not contribute or only contribute insufficiently to the after-treatment of the exhaust gas.

Usually, components such as perforated panels, perforated pipes and/or guide elements or guide panels arranged upstream of the receiving chamber are used in order to impart a respective direction of flow to the exhaust gas entering or flowing into the receiving chamber, which should lead to an improved equal distribution. It was, however, found that these components can lead not to a significant improvement of the equal distribution, but rather to an excessively high exhaust back pressure.

The previously-mentioned problems and disadvantages can now be avoided by the catalytic converter according to the invention. Firstly, an especially good equal distribution of the exhaust gas in the receiving chamber can be realized, and secondly, an excessive exhaust back pressure can be avoided. Trials have shown that an especially high equal distribution index (GVI) of the exhaust gas in the receiving chamber can be realized by the catalytic converter according to the invention, wherein the equal distribution index can, for example, be 93.1 percent. As is known, an equal distribution index of 95 percent is at least almost ideal, wherein an almost ideal equal distribution index can be realized in the catalytic converter according to the invention.

Since the outlet openings are each arranged offset from the inlet opening, and are therefore offset with respect to the inlet opening, the exhaust gas cannot flow on a straight path from the inlet opening to the respective outlet opening, rather the exhaust gas builds up in the central part of the receiving chamber and is subsequently distributed into the edge regions of the receiving chamber, in which edge regions there are larger flow surfaces than in the central part. Thus, an especially advantageous equal distribution index can be realized. An excessively high exhaust back pressure can simultaneously be avoided. As a result, an especially high efficiency can be realized, with which the catalytic converter can after-treat the exhaust gas. An especially long lifespan pf the catalytic converter can also result from the embodiment of the catalytic converter according to the invention, since, for example, the catalytic coating is not only used locally, rather it is at least fundamentally consistently used in order to after-treat the exhaust gas.

In order to be able to realize an especially high equal distribution index of the exhaust gas in the receiving chamber, it is provided in an embodiment of the invention that the housing has exactly one inlet opening, through which the exhaust gas can be introduced into the receiving chamber. In other words, the previously-mentioned inlet opening is preferably the only inlet opening through which the exhaust gas can flow into the receiving chamber, or flows in during an operation of the internal combustion engine.

A further embodiment is characterized in that the inlet opening and the respective outlet opening are spaced apart from each other along a main direction of flow of the exhaust gas flowing through the housing. Here, the main direction of flow runs, for example, perpendicular to the previously-mentioned first plane and/or to the previously-mentioned second plane. In particular, the main direction of flow coincides with a longitudinal direction of extension of the housing or of the catalytic converter. In particular in the fully manufactured state of the motor vehicle, the catalytic converter is a component of an exhaust gas system, the longitudinal direction of extension of which coincides, for example, with the mentioned main direction of flow.

In order to especially advantageously introduce the exhaust gas into the receiving chamber and to, as a result, be able to realize an especially advantageous equal distribution of the exhaust gas in the receiving chamber, it is provided in a further embodiment of the invention that an exhaust pipe element that can be flowed through by the exhaust gas is arranged upstream of the inlet opening and thus upstream of the receiving chamber, which exhaust pipe element is fluidically connected with the inlet opening and is thus, by means of the inlet opening, fluidically connected with the receiving chamber. The exhaust gas flowing through the exhaust pipe element can thereby flow out of the exhaust pipe element and subsequently flow through the inlet opening and thus flow through the inlet opening into the receiving chamber. Here, the exhaust pipe element or its longitudinal direction of extension extends at an angle to the main direction of flow, so that, by means of the exhaust pipe element, it can be effected that the exhaust gas flows through the inlet opening at an angle to the main direction of flow and thereby flows into the receiving chamber at an angle.

In a further, especially advantageous embodiment of the invention, the inlet opening extends in an inlet wall of the housing. The inlet wall completely seals and delimits the receiving chamber, with the exception of the inlet opening, in a direction running parallel to the main direction of flow and thus, for example, runs perpendicular to the respective plane, and pointing away from the respective outlet opening. In the peripheral direction of the receiving chamber, the receiving chamber is, for example, completely delimited by a circumferential shell of the housing, wherein the shell, for example, forms the previously-mentioned, inner peripheral lateral surface of the housing. The shell is, for example, formed separately from the inlet wall and is connected with the inlet wall. The inlet wall extends in a plane running perpendicular to the main direction of flow, which is thus, for example, the previously-mentioned second plane. Overall, it is recognizable that the inlet opening is formed in the inlet wall. By means of this embodiment, an especially advantageous equal distribution in the receiving chamber can be realized.

A further embodiment is characterized in that the respective outlet opening extends in an outlet wall that is in particular common to the outlet openings. The outlet wall is, for example, formed separately from the inlet wall and/or separately from the shell, and is connected with the shell. The inlet wall and/or the outlet wall can be formed as one part. In this respect the feature that the outlet openings are separated from each other and spaced apart from each other can in particular be understood to mean that a wall region of the outlet wall functioning as a separating wall is arranged between the outlet openings.

In a further, especially advantageous embodiment of the invention it is provided that the outlet wall completely seals the receiving chamber, with the exception of the outlet opening, in a direction running parallel to the main direction of flow and pointing away from the inlet opening, wherein the outlet wall and thus the respective outlet opening extend in a plane running perpendicular to the main direction of flow, which is, for example, the previously-mentioned first plane. The exhaust gas can thereby be especially advantageously accumulated or diverted, so that-without excessive exhaust back pressure y an especially good equal distribution of the exhaust gas in the receiving chamber can be realized.

In order to be able to realize an especially good equal distribution and thus an especially advantageous after-treatment of the exhaust gas, it is provided in a further embodiment of the invention that at least a first section of an end face of the catalyst carrier facing the outlet wall lies directly on at least one second section of the outlet wall that is arranged next to the respective outlet opening. The exhaust gas is thereby forced to use a flow passage next to the center of the receiving chamber, in order to be able to flow from the inlet opening to the respective outlet opening. If the monolith or its first section were spaced apart from the outlet wall or from its second section, the exhaust gas would simply flow through the center of the receiving chamber, which would lead to no or only insufficient equal distribution of the exhaust gas. This can now be avoided.

It is in particular preferably provided that a third section of the monolith that, for example, connects to the first section of the end face overlaps one of the outlet openings, i.e., a first part of one of the outlet openings, wherein for example, alternatively or additionally, a fourth section of the end face that, for example, connects to the first section of the end face, overlaps the other outlet opening or a second part of the other outlet opening. Therefore, an advantageous equal distribution can firstly be realized, and, secondly, excessive exhaust gas back pressure can be avoided.

Finally, it has been shown to be especially advantageous if the second section of the outlet wall is arranged between the outlet openings. The second section is thus, for example, the previously-mentioned wall region of the outlet wall that is arranged between the outlet openings. The exhaust gas back pressure can thereby be kept especially low, wherein an especially good equal distribution can simultaneously be ensured.

A second aspect of the invention relates to a motor vehicle, preferably formed as a motor car, in particular as a passenger motor car, which has at least one catalytic converter according to the first aspect of the invention. Advantages and advantageous embodiments of the first aspect of the invention are to be regarded as advantages and advantageous embodiments of the second aspect of the invention, and vice versa.

Further advantages, features and details of the invention result from the description of preferred exemplary embodiments below, as well as by means of the drawings. The features and feature combinations referred to in the description as well as the features and feature combinations referred to below in the description of the figures and/or shown solely in the figures can be used not only in each specified combination but also in other combinations or alone without leaving the scope of the invention.

BRIEF DESCRIPTION OF THE DRAWINGS

FIG. 6b is a further schematic cross-sectional view of a catalytic converter according to FIG. 6a.

DETAILED DESCRIPTION OF THE DRAWINGS

Figure 1:
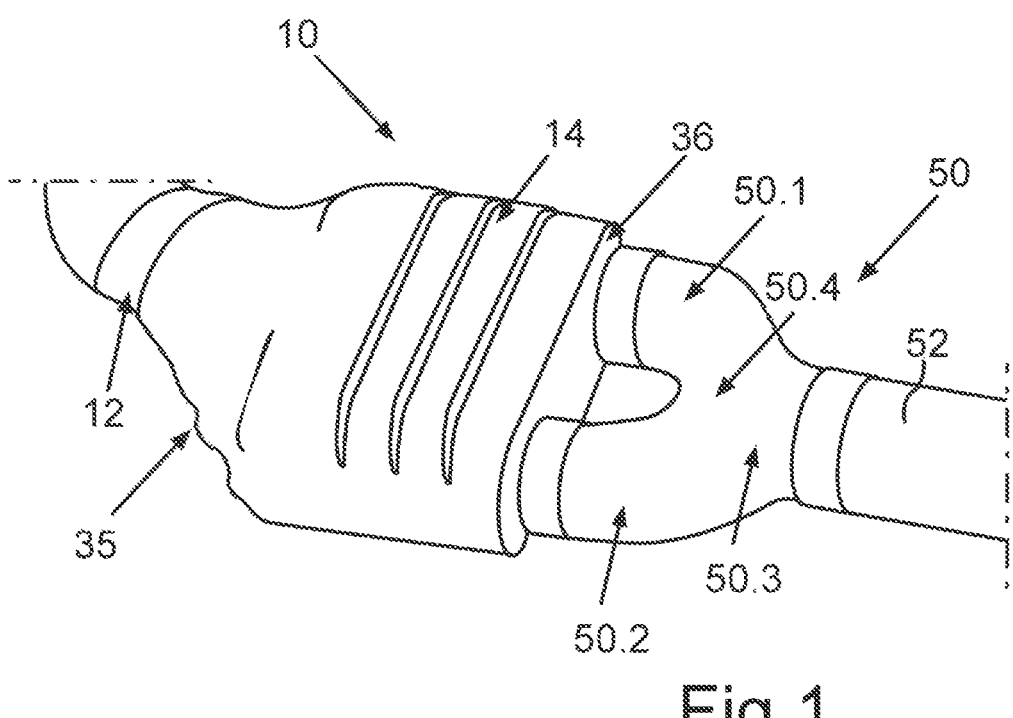
FIG. 1 is a schematic perspective view of a catalytic converter according to the invention.

In the figures, the same or functionally identical elements are provided with the same reference numerals.

FIG. 1 shows a catalytic converter 10 for a motor vehicle in a schematic perspective view. This means that the motor vehicle has the catalytic converter 10 in its fully manufactured state. The motor vehicle also has an internal combustion engine, by means of which the motor vehicle can be powered. In a fired operation of the internal combustion engine, combustion processes occur in the internal combustion engine, in particular in combustion chambers of the internal combustion engine, from which exhaust gas results. The exhaust gas flows out of the combustion chambers or out of the internal combustion engine and into an exhaust manifold of the motor vehicle, after which the exhaust gas can flow through the exhaust manifold. The exhaust manifold is also referred to as the exhaust gas system and comprises at least the catalytic converter 10, which can be flowed through by the exhaust gas. By means of the catalytic converter 10, the exhaust gas is after-treated. It can be recognized from FIG. 1 that the exhaust gas system can have an exhaust pipe element 12, which can, for example, be formed separately to the catalytic converter 10. The exhaust pipe element 12 can be flowed through by the exhaust gas.

Figure 2:
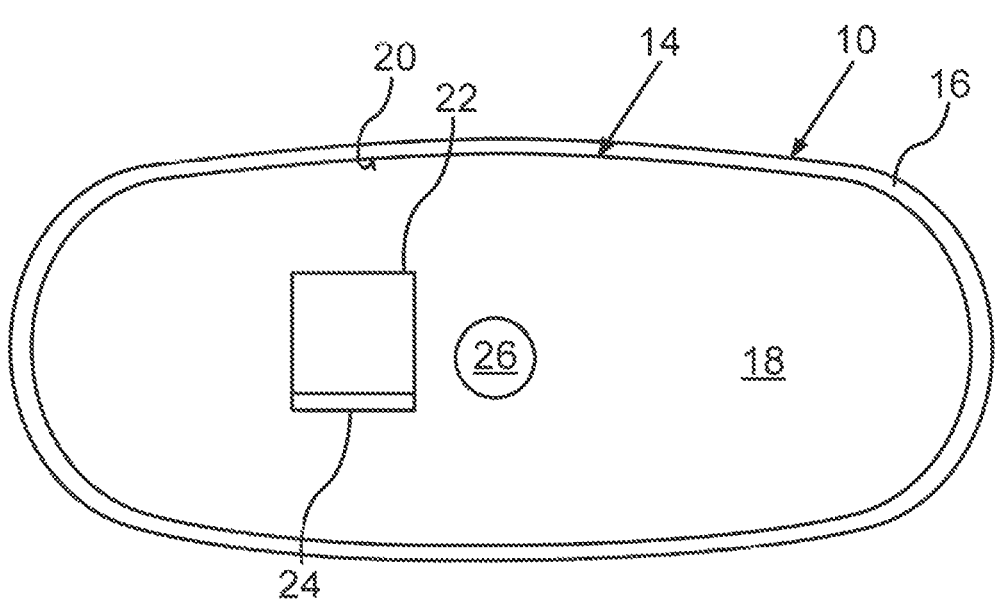
FIG. 2 is a schematic cross-sectional view of the catalytic converter.

In an overview of FIG. 2, it is especially well recognizable that the catalytic converter 10 has a housing 14 that can be flowed through by the exhaust gas, which can have a shell 16 that is especially easily recognizable from FIG. 2 and is, for example, formed of one piece or multiple pieces. The shell 16 and therefore the housing 14 delimit a receiving chamber 18 of the catalyst carrier 10. The receiving chamber 18 is thereby, in particular directly, delimited by an inner peripheral lateral surface 20 of the shell 16 or of the housing 14. The inner peripheral lateral surface 20 and thus the receiving chamber 18 are herein formed as ovals or ellipses. Certainly, a round housing 14 with a correspondingly shaped inner peripheral lateral surface 20 is conceivable. The catalytic converter 10 also has a catalyst carrier 22, that is especially schematically represented in FIG. 2, which is also referred to as a monolith or substrate, in particular a catalyst substrate, and is provided with at least one catalytic coating 24 that is also especially schematically represented in FIG. 2. The catalyst carrier 22 lies on the inner peripheral lateral surface 20.

The figures show a catalytic converter 10 according to the invention. Using the FIGS. 4a, 4b, 5a and 5b, the principle structure of the catalytic converter 10 according to the invention is explained.

In order to, on the one hand, realize an especially good equal distribution of the exhaust gas in the receiving chamber 18 and, on the other hand, to be able to keep the exhaust gas back pressure especially low, the housing 14 has exactly one inlet opening 26, through which the exhaust gas can be introduced or flows into the receiving chamber 18. The inlet opening 26, which is also referred to as the in-flow opening, of the catalytic converter 10 is thus arranged. The inlet opening 26 is provided substantially centrally to a cross section of the catalytic converter 10. The exhaust pipe element 12, in particular its exhaust duct 30 that can be flowed through by an exhaust gas, is thereby arranged upstream of the inlet opening 26 and thus upstream of the receiving chamber 18.

The housing 14 also has at least two outlet openings 32 and 34, through which the exhaust gas can be discharged from or flows out of the receiving chamber 18. The outlet openings 32 and 34 are thereby separated from each other and are thus spaced apart from each other, which is especially easily recognizable from FIGS. 4b and 5b. The respective outlet opening 32 or 34 is also arranged offset or at least partially offset from the inlet opening 26. In the exemplary embodiments according to the FIGS. 4a, 4b, 5a and 5b, the respective outlet openings 32 or 34 are largely arranged without overlap or covering by the inlet opening 26, i.e., next to the inlet opening 26, and are thus not overlapped or covered by the inlet opening 26.

Figure 3:
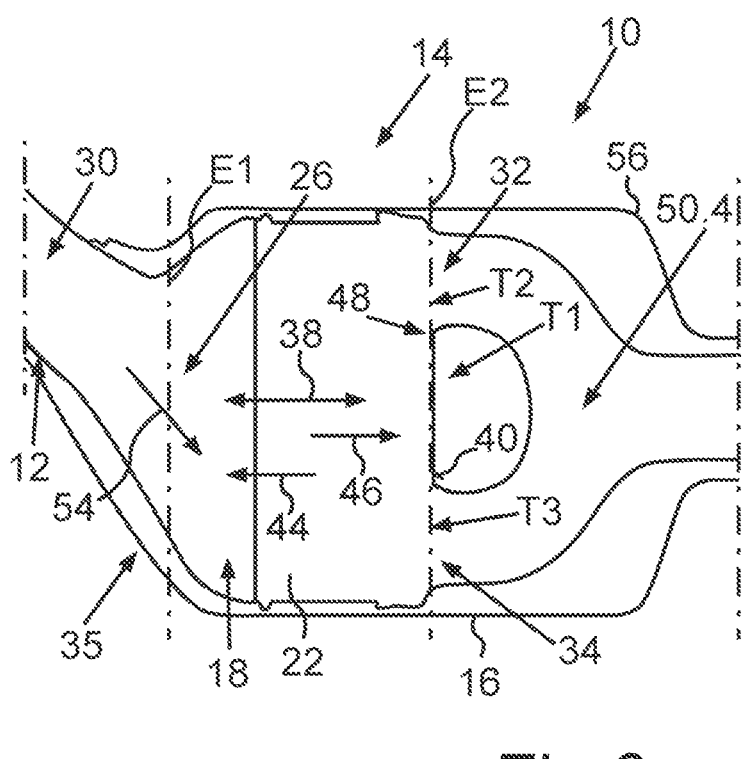
FIG. 3 is a schematic and sectional plan view of the catalytic converter.
Figures 4A, 4B:
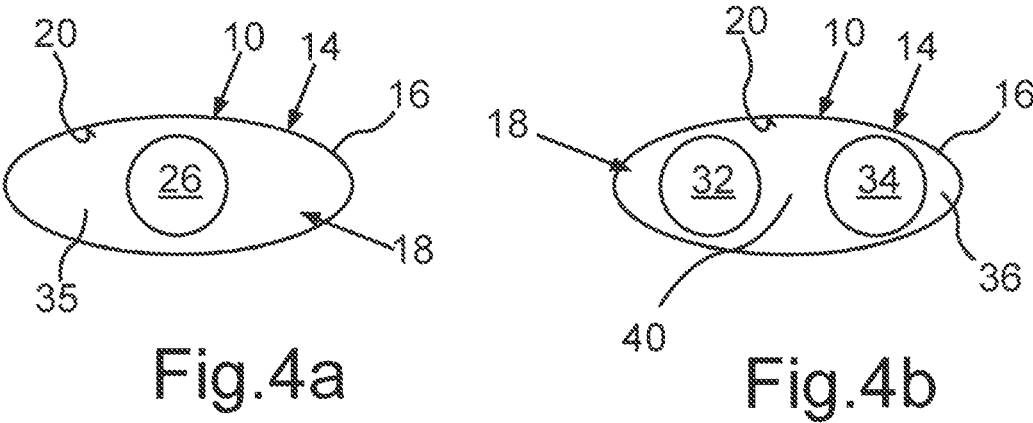
FIG. 4a is a schematic cross-sectional view of the catalytic converter according to a first basic embodiment.
FIG. 4b is a further schematic cross-sectional view of the catalytic converter according to the first embodiment.
Figure 5A:
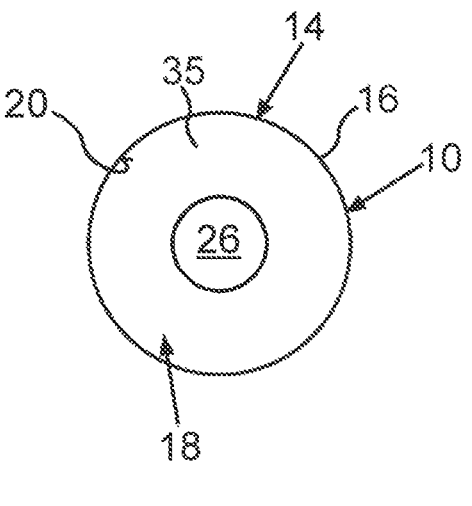
FIG. 5a is a schematic cross-sectional view of the catalytic converter according to a second basic embodiment.
Figure 5B:
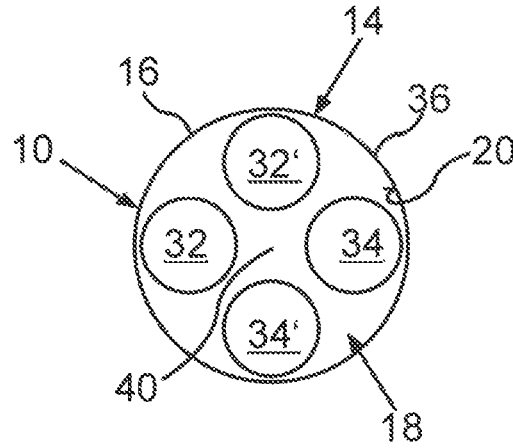
FIG. 5b is a further schematic cross-sectional view of the catalytic converter according to the second embodiment.

The FIGS. 4a, b show a first basic embodiment of the catalytic converter 10. As can be especially easily recognized from an overview of FIGS. 1 to 4b, the inlet opening 26 is, for example, formed centrally in an inlet wall 35 of the housing 14, wherein the inlet wall 35 and thus the inlet opening 26 extend in an imaginary first plane E1, shown in FIG. 3. The outlet openings 32 and 34 are formed in an outlet wall 36 of the housing 14 that is common to the outlet openings 32 and 34, wherein the outlet wall 36 and thus the outlet openings 32 and 34 extend in a common second plane E2 that is recognizable from FIG. 3. The planes E1 and E2 run parallel to each other and are spaced apart from each other. A main direction of flow is illustrated in FIG. 3 by an arrow 38. The exhaust gas flows along the main direction of flow 38 from the inlet opening 26 and thus from the inlet wall 35 in the direction of the outlet wall 36 and thus in the direction of the outlet opening 32 and 34 and in particular to the outlet openings 32 and 34. Here, the main direction of flow 38 runs perpendicular to the planes E1 and E2 and centrally in the housing 14, so that the planes E1 and E2 or the inlet wall 35 and the outlet wall 36 are spaced apart from each other along the main direction of flow. By the feature that the outlet openings 32 and 34 are separated from each other and spaced apart from each other, it should in particular be understood that a wall region 40 of the outlet wall 36 functioning as a separating wall is arranged between the outlet openings 32 and 34.

Furthermore it is especially easily identifiable from FIG. 4a that the inlet wall 35 completely seals or delimits the receiving chamber 18, with the exception of the inlet opening 26, in a first direction that runs parallel to the main direction of flow 38, points away from the outlet wall 36 and thus from the outlet openings 32 and 34 and is illustrated in the FIG. 3 by an arrow 44. Therefore, the outlet wall 36 seals or delimits the receiving chamber 18, with the exception of the outlet openings 32 and 34, in a second direction that runs parallel to the main direction of flow 38, points away from the inlet wall 35 and thus from the inlet opening 26, is opposite to the first direction 44 and is illustrated in FIG. 3 by an arrow 46. The receiving chamber 18 is thus formed by the shell 16, the inlet wall 35 and the outlet wall 36.

In order to achieve an especially advantageous equal distribution of the exhaust gas in the receiving chamber 18, at least a first section T1 of an end face 48 of the catalyst carrier 22 facing the outlet wall 36 lies directly on the wall region 40 arranged next to and thus between the outlet openings 32 and 34. Therefore at least, for example, a part of the exhaust gas flowing into the receiving chamber 18 through the inlet opening 26 flows through the catalyst carrier 22 towards the wall region 40, and is subsequently forced to flow from the central region of the receiving chamber 18 and thus of the catalyst carrier 22, in the central region of which the wall region 40 is arranged, into outer lateral edge regions of the receiving chamber 18 and thus of the catalyst carrier 22, because only there can the exhaust gas flow out of the receiving chamber 18 via the outlet openings 32 and 34. A section T2 of the end face 48 of the catalyst carrier 22 that connects to the section T1 is, for example, arranged in overlap or covering with the outlet opening 32, and a section T3 of the end face 48 that, for example, connects to the section T1 is, for example, arranged in overlap or covering with the outlet opening 34. Especially advantageous conditions of flow through the catalyst carrier 22 can thereby be achieved, in that the exhaust gas flowing centrally through the inlet opening 26 into the receiving chamber 18 does not only flow through a central region of the catalyst carrier 22, rather the exhaust gas flowing in is also pushed into edge regions of the catalyst carrier 22.

It is recognizable from FIG. 1 that the exhaust gas system has a Y pipe 50, also referred to as a Y piece, which is at least fundamentally formed as a Y-shape. The Y pipe 50 is respectively fluidically connected to the outlet openings 32 and 34 with its pipe sections 50.1 and 50.2. The exhaust gas flowing out of the receiving chamber 18 through the outlet openings 32 and 34 flows into the respective pipe sections 50.1 and 50.2 into the Y pipe 50 and is merged by means of the Y pipe in its manifold 50.3 and flows out of the manifold 50.3 into an exhaust duct of an exhaust pipe 52. The Y pipe 50 is, for example, formed separately from the catalytic converter 10 or separately from the housing 14 and is mechanically connected at least indirectly, in particular directly, with the housing 14. The Y pipe 50 is, for example, a Y shell or is formed by at least or exactly two combined Y-shaped shells.

Advantageously, the Y pipe 50 is in particular configured in a flow-optimising way in the region of the merging 50.4 of the pipe sections 50.1 and 50.2 and of the manifold 50.3, so that a dead water zone does not form in the Y pipe 50 in the region of the merging 50.4, whereby the exhaust gas can flow though the Y pipe 50 with little resistance.

It is recognizable from FIGS. 1 and 3 that the exhaust pipe element 12 that is arranged upstream of the inlet opening 26 and that can be flowed through by the exhaust gas as well as being fluidically connected with the receiving chamber 18 via the inlet opening 26 runs in a third direction, at an angle to the main direction of flow 38. The exhaust pipe element 12 causes—as is illustrated by an arrow 54 in FIG. 3—the exhaust gas to flow through the inlet opening 26 in a third direction, at an angle to the main direction of flow 38, and to thereby flow into the receiving chamber 18 at an angle to the main direction of flow 38.

Because the exhaust gas does not flow into the receiving chamber 18 perpendicular to the plane E1, but rather flows in at an angle to the plane E1 and at an angle to the main direction of flow, which is also referred to as a Fischer funnel, an especially advantageous distribution of the exhaust gas in the receiving chamber 18 can be achieved. It is in particular recognizable from FIG. 3 that the inlet wall 35 can have a fundamentally funnel-shaped structure, wherein the inlet wall 35, starting from the shell 16 of the housing 14, is connected in a tapering, funnel-shaped manner with the exhaust pipe element 12. Here, the funnel-shaped inlet wall 35 furthermore has an inlet opening (26) in the plane E1 (FIG. 3) through which the exhaust gas can be introduced into the receiving chamber (18), and at least two outlet openings (32, 34), which are separated from each other and are each arranged at least partially offset from the inlet opening (26) and through which the exhaust gas can be discharged from the receiving chamber (18).

In a further embodiment, the Y pipe 50 can additionally be enclosed by a housing 56 (FIG. 3).

According to FIGS. 1 to 3 and 4a, 4b, the receiving chamber 18 or the shell 16 has an at least substantially oval cross section. In other words, the inner peripheral lateral surface 20 and the receiving chamber 18 are at least substantially oval-shaped. Catalytic converters 10 with oval cross-sections are in particular suited for passenger motor cars, since the spatial constraints are delimited by the undercarriage. In the first embodiment shown in FIGS. 5a, b, the inner peripheral lateral surfaces 20 and thus the receiving chamber 18 are formed circularly. Catalytic converters 10 with a round cross-section are in particular suited for off-road vehicles and lorries, since the spatial constraints are less delimited by the undercarriage. It is recognizable from FIG. 5a that the inlet opening 26 is arranged at least substantially centrally, i.e., in the middle of the receiving chamber 18, wherein the outlet openings 32, 34 are arranged off-center in a first embodiment. In a second embodiment, the housing 14 has exactly four outlet openings 32, 32', 34 and 34'. Since the outlet openings 32, 32', 34 and 34' are arranged offset from the inlet opening 26, the outlet openings 32, 32', 34 and 34' are arranged out of alignment with the inlet opening 26, also referred to as the inlet, as it were.

Figure 6A:
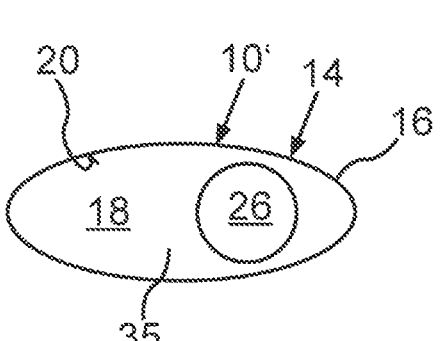
FIG. 6a is a schematic cross-sectional view of a catalytic converter that is known per se.
Figure 6B:
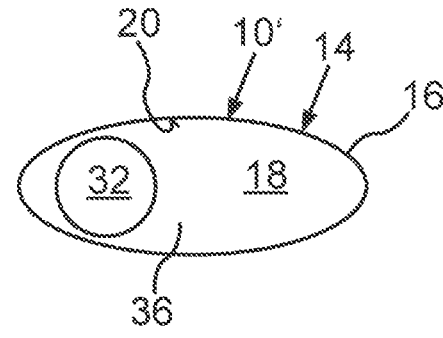

FIGS. 6a, b show a catalytic converter 10' that is known per se. Here, the housing 14 has exactly one inlet opening 26, which, in comparison to the embodiments shown in FIG. 1 to FIG. 5b, is arranged off-center with respect to the receiving chamber 18. According to FIGS. 6a, b, the housing 14 also has exactly one outlet opening 32, which is also arranged off-center with respect to the receiving chamber 18, and in particular in such a way that the outlet opening 32 is arranged completely offset with respect to the inlet opening 26.

LIST OF REFERENCE CHARACTERS

10, 10' Catalytic converter
12 Exhaust pipe element
14 Housing
16 Shell
18 Receiving chamber
20 Inner peripheral lateral surface
22 Catalyst carrier
24 Catalytic coating
26 Inlet opening
30 Exhaust duct
32, 32' Outlet opening
34, 34' Outlet opening
35 Inlet wall
36 Outlet wall
38 Main direction of flow
40 Wall region
44 First direction
46 Second direction
48 End face
50 Y pipe
50.1 Pipe section
50.2 Pipe section
50.3 Receiver pipe
50.4 Merging
52 Exhaust pipe
54 Third direction
56 Housing
E1, E2 Planes
T1, T2, T3 Sections

The invention claimed is:

1. A catalytic converter (10) for after-treatment of exhaust gas of an internal combustion engine for a motor vehicle, comprising:

a housing (14), wherein the exhaust gas is flowable through the housing (14) and wherein the housing (14) has a receiving chamber (18); and a catalyst carrier (22), wherein the catalyst carrier (22) is disposed in the receiving chamber (18) and has a catalytic coating (24);

wherein the receiving chamber (18) is delimited by an inner peripheral lateral surface (20) of the housing (14) and the catalyst carrier (22) lies on the inner peripheral lateral surface (20);

wherein the housing (14) has an inlet opening (26) via which the exhaust gas is introducible into the receiving chamber (18) and has at least two outlet openings (32, 34) that are disposed separated from each other and are at least partially offset from the inlet opening (26) and via which the exhaust gas is dischargeable from the receiving chamber (18);

wherein the inlet opening (26) is spaced apart from the at least two outlet openings (32, 34) along a main direction of flow (38) of the exhaust gas flowing through the housing (14);

wherein the inlet opening (26) is formed in an inlet wall (35) which completely seals the receiving chamber (18), except for the inlet opening (26), in a direction (44) running parallel to the main direction of flow (38) and pointing away from the at least two outlet openings (32, 34) and wherein the inlet wall (35) extends in a plane (E1) running perpendicular to the main direction of flow (38);

wherein the at least two outlet openings (32, 34) are formed in an outlet wall (36) which completely seals the receiving chamber (18), except for the at least two outlet openings (32, 34), in a direction (46) running parallel to the main direction of flow (38) and pointing away from the inlet opening (26) and wherein the outlet wall (36) extends in a plane (E2) running perpendicular to the main direction of flow (38);

wherein a first section (T1) of an end face (48) of the catalyst carrier (22) facing the outlet wall (36) lies directly on a second section (40) of the outlet wall (36) that is disposed next to the at least two outlet openings (32, 34);

wherein the second section (40) is disposed between the at least two outlet openings (32, 34);

wherein the housing (14) has a shell (16), wherein disposed within the shell (16) is a Y pipe (50) that has a first pipe section (50.1) fluidically connected to a first one (32) of the at least two outlet openings (32, 34) and a second pipe section (50.2) fluidically connected to a second one (34) of the at least two outlet openings (32, 34), wherein the first section (T1) of the end face (48) of the catalyst carrier (22) facing the outlet wall (36) and the second section (40) of the outlet wall (36) are disposed between the first pipe section (50.1) and the second pipe section (50.2), wherein the first pipe section (50.1) and the second pipe section (50.2) merge together in a merging region (50.4) of the first pipe section (50.1) and the second pipe section (50.2) at a manifold (50.3) of the Y pipe (50), and wherein the manifold (50.3) of the Y pipe (50) is fluidically connectable to an exhaust duct of an exhaust pipe (2) of the motor vehicle.

2. The catalytic converter (10) according to claim 1, wherein the housing (14) has exactly one inlet opening (26).

3. The catalytic converter (10) according to claim 1, further comprising an exhaust pipe element (12), wherein the exhaust pipe element (12) is disposed upstream of the inlet opening (26) and is connected fluidically with the inlet opening (26), wherein the exhaust gas is flowable through the exhaust pipe element (12), and wherein the exhaust pipe element (12) runs at an angle to the main direction of flow (38).

4. A motor vehicle, comprising:
the catalytic converter (10) according to claim 1.

* * * * *